Patented Oct. 24, 1922.

1,432,845

UNITED STATES PATENT OFFICE.

HIRAM L. EDNEY, OF WIRT, OKLAHOMA, ASSIGNOR TO EARL J. RUEB, OF WIRT, OKLAHOMA.

BATTERY GRID AND PROCESS OF MAKING SAME.

No Drawing.   Application filed February 25, 1920.   Serial No. 361,429.

*To all whom it may concern:*

Be it known that I, HIRAM L. EDNEY, a citizen of the United States, residing at Wirt, in the county of Carter and State of Oklahoma, have invented certain new and useful Improvements in Battery Grids and Processes of Making Same, of which the following is a specification.

This invention relates to storage battery plates or grids and the process for making the same.

One object of the present invention is to evolve a process whereby storage battery plates or grids may be quickly produced without the disagreeable features and liability to harm the workmen attending the manufacture of such plates by processes heretofore employed.

A further object of the invention is to produce a battery plate or grid by a process which will provide for the protection against heat of the active material of the plate.

Another object of the invention is to evolve a process whereby such plates may be made proof against ready disintegration and will possess the desired degree of porosity.

My invention relates both to the manufacture of positive and negative plates and I will first describe the manner in which the positive plate is produced. I first mix one pint of sulfuric acid of 1200° specific gravity and one ounce of liquid collodion and stir this mixture until a white scum appears on the surface. I next skim or otherwise remove this scum and add to the solution one-half ounce of bicarbonate of soda and one ounce of glycerine (U. S. P.). The resulting mixture is then incorporated with a sufficient quantity of red lead to produce a stiff or almost dry paste, and while the paste is still hot, heat being generated as a result of chemical reaction which takes place, I fill this paste into the lead grids. The plates thus produced may then be passed between rubber rolls or may be smoothed off with a trowel or other implement and after being thus treated they are dried either in a warm place or preferably in an oven.

After the plates have been dried they are ready for the forming process and in carrying out this process I add to one quart of hard water three ounces of bicarbonate of soda and one ounce of aluminum sulfate. The plates or filled grids are then immersed in this solution and are charged with for example ten amperes for seven plates in a group, three positive and four negative.

I employ collodion for the reason that it will withstand enormous heat without deteriorating and therefore serves to protect the active material and likewise prevent deterioration of the glycerine employed. My reason for employing bicarbonate of soda is that the acid will react with this ingredient to generate carbon dioxid gas which will give to the plates the desired porosity. I employ aluminum sulfate for the purpose of causing the active material to draw together or shrink and thus bind the collodion and glycerine together, and this ingredient serves this purpose without destroying the porosity of the plates.

The negative plates are prepared in substantially the same manner as the positive plates, so far as mechanical steps of the process are concerned but in preparing the filler for the negative plates I use about one-quarter pint of sulfuric acid of 1150° specific gravity mixed with two ounces of Irish glue.

Having thus described the invention, what is claimed as new is:

1. The process of producing a storage battery positive plate which comprises filling a suitable grid with a paste comprising a mixture of an active material, a binder, and ingredients capable of chemical reaction to produce a gas, drying the plate, and subsequently forming the plate.

2. The process of producing a storage battery positive plate which comprises filling a suitable grid with a paste comprising a mixture of an active material, a binder, an acid, and a carbonate, drying the plate, and subsequently forming the plate.

3. The process of producing a storage battery positive plate which comprises filling a suitable grid with a paste comprising an active material, a binder, sulphuric acid, and a carbonate of soda, drying the plate and subsequently forming the plate.

4. The process of producing a storage battery positive plate which comprises filling a suitable grid with a paste comprising an active material, collodion, and ingredients capable of chemical reaction to evolve a gas, drying the plate, and subsequently forming the plate.

5. The process of producing a storage battery positive plate which comprises filling a suitable grid with a paste comprising an active material, collodion, glycerine, sulfuric acid, and a sodium carbonate, drying the plate, and subsequently forming the plate.

6. The process of producing a storage battery positive plate which comprises filling a suitable grid with a paste, comprising a mixture of an active material, collodion, glycerine, sulfuric acid, and a sodium carbonate, drying the plate, and subsequently forming the plate in a solution comprising water, a sodium carbonate, and aluminum sulfate.

7. A filling paste for a storage battery positive grid comprising a mixture of an active material, and ingredients capable of chemical reaction to evolve a gas.

8. A filling paste for a storage battery positive grid comprising a mixture of an active material, a binder, and ingredients capable of chemical reaction to evolve a gas.

9. A filling paste for a storage battery positive grid comprising a mixture of an active material, a binder, an acid, and a carbonate.

10. A filling paste for a storage battery positive grid comprising a mixture of an active material, a binder, sulfuric acid, and a sodium carbonate.

11. A filling paste for a storage battery positive grid comprising a mixture of an active material, collodion, and ingredients capable of chemical reaction to evolve a gas.

12. A filling paste for a storage battery positive grid comprising a mixture of an active material, collodion, sulfuric acid, and a carbonate.

13. A filling paste for a storage battery positive grid comprising a mixture of an active material, a binder, glycerine, and ingredients capable of reaction to evolve a gas.

14. A filling paste for a storage battery positive grid comprising a mixture of an active material, collodion, glycerine, sulfuric acid, and a sodium carbonate.

15. A filling paste for a storage battery positive grid comprising a mixture of an active material, sulfuric acid of approximately twelve hundred degrees specific gravity one pint, collodion one ounce, sodium bicarbonate one-half ounce, and glycerine one ounce.

16. A filling paste for a storage battery positive grid comprising a mixture of sulfuric acid of approximately twelve hundred degrees specific gravity one pint, collodion one ounce, sodium bicarbonate one-half ounce, glycerine one ounce, and red lead, as an active material, in quantity sufficient to form a paste.

17. A storage battery positive plate having a filling which has been rendered porous by the evolution of a gas therein.

18. A storage battery positive plate comprising an active material and a binder and which filling has been rendered porous by the evolution of a gas therein.

19. A storage battery positive plate having a filling comprising an active material, collodion, and glycerine, and which filling has been rendered porous by the evolution of a gas therein.

20. The process of producing a storage battery positive plate which includes the step of generating a gas in the filling paste for the plate whereby to render the said filling porous and permeable.

In testimony whereof I affix my signature.

HIRAM L. EDNEY. [L. S.]